United States Patent

Naruse et al.

[11] Patent Number: 6,072,822
[45] Date of Patent: Jun. 6, 2000

[54] TERMINAL UNIT FOR USE WITH RADIO SYSTEM AND SEARCHING METHOD

[75] Inventors: Tetsuya Naruse, Chiba; Katsuya Yamamoto, Tokyo, both of Japan

[73] Assignee: Sony Corporation, Tokyo, Japan

[21] Appl. No.: 08/998,385

[22] Filed: Dec. 24, 1997

[30] Foreign Application Priority Data

Jan. 14, 1997 [JP] Japan .............................. P09-004990

[51] Int. Cl.[7] .............................. H04J 13/04; H04B 1/707
[52] U.S. Cl. ......................... 375/147; 375/148; 375/150
[58] Field of Search .................................... 375/347, 349, 375/130, 140, 144, 147, 148, 150; 370/335, 342, 479

[56] References Cited

U.S. PATENT DOCUMENTS

| | | | |
|---|---|---|---|
| 5,508,708 | 4/1996 | Ghosh et al. ............................ | 324/457 |
| 5,627,835 | 5/1997 | Witter ..................................... | 370/320 |
| 5,764,687 | 6/1998 | Easton ..................................... | 375/206 |
| 5,818,887 | 10/1998 | Sexton et al. ............................ | 375/355 |
| 5,889,815 | 3/1999 | Iwakiri ..................................... | 375/208 |
| 5,945,948 | 8/1999 | Buford et al. ........................... | 342/457 |
| 5,950,131 | 9/1999 | Vilmur ..................................... | 455/434 |
| 5,956,367 | 9/1999 | Koo et al. ................................ | 375/206 |

*Primary Examiner*—Young T. Tse
*Attorney, Agent, or Firm*—Jay H. Maioli

[57] ABSTRACT

A next alternative storing memory that stores a next alternative code is included in a CDMA cellular telephone, so that when demodulated data cannot be obtained, in the case that a code as a next alternative has been stored in the next alternative storing memory, a partial searching process is performed with the code so as to demodulate data. When data can be demodulated, a searching process is performed with the code.

8 Claims, 7 Drawing Sheets

TERMINAL UNIT FOR USE WITH RADIO SYSTEM AND SEARCHING METHOD

BACKGROUND OF THE INVENTION

1. Field of the Invention

The present invention relates to a terminal unit for use with radio system suitable for a CDMA (Code Division Multiple Access) type cellular telephone system, and to a searching method thereof.

2. Description of the Related Art

In recent years, a CDMA type cellular telephone system has become attractive. In the CDMA type cellular telephone system, a pseudo-random code is used as a spread code. A carrier of a transmission signal is spectrum-spread. The pattern and phase of each spread code in the code sequence are varied so as to perform a multiple access.

In the CDMA system, the spectrum spread method is used. In the spectrum spread system, when data is transmitted, the carrier is primarily modulated with the transmission data. In addition, the carrier that has been primarily modulated is multiplied by a PN (Pseudorandom Noise) code. Thus, the carrier is modulated with the PN code. As an example of the primarily modulating method, balanced QPSK modulating method is used. Since the PN code is a random code, when the carrier is modulated by the PN code, the frequency spectrum is widened.

When data is received, the received data is multiplied by the same PN code that has been modulated on the transmission side. When the same PN code is multiplied and the phase is matched, the received data is de-spread and thereby primarily modulated data is obtained. When the primarily modulated data is demodulated, the original data is obtained.

In the spectrum spread method, to de-spread the received signal, the same PN code that has been modulated on the transmission side is required for both the pattern and the phase. Thus, when the pattern and the phase of the PN code are varied, the multiple access can be performed. The method for varying the pattern and the phase of each spread code in the code sequence and thereby performing the multiple access is referred to as CDMA method.

As cellular telephone systems, an FDMA (Frequency Division Multiple Access) system and a TDMA (Time Division Multiple Access) system have been used. However, the FDMA system and the TDMA system cannot deal with a drastic increase of the number of users.

In other words, in the FDMA system, the multiple access is performed on different frequency channels. In an analog cellular telephone system, the FDMA system is usually used.

However, in the FDMA system, since the frequency use efficiency is bad, a drastic increase of the number of users tends to cause channels to run short. When the intervals of channels are narrowed for the increase of the number of channels, the adjacent channels adversely interfere with each other and thereby the sound quality deteriorates.

In the TDMA system, the transmission data is compressed on the time base. Thus, the use time is divided and thereby the same frequency is shared. The TDMA system has been widely used as a digital cellular telephone system. In the TDMA system, the frequency use efficiency is improved in comparison with the simple FDMA system. However, in the TDMA system, the number of channels is restricted. Thus, it seems that as the number of users drastically increases, the number of channels runs short.

On the other hand, the CDMA system has excellent interference resistance. Thus, in the CDMA system, adjacent channels do not interfere with each other. Consequently, the frequency use efficiency improves and more channels can be obtained.

In the FDMA system and the TDMA system, signals tend to be affected by fading due to multi-path interference.

In other words, as shown in FIG. 1, a signal is sent from a base station 201 to a portable terminal unit 202 through a plurality of paths. In addition to a path P1 in which a radio wave of the base station 201 is directly sent to the portable terminal unit 202, there are a path P2, a path P3, and so forth. In the path P2, the radio wave of the base station 201 is reflected by a building 203A and sent to the portable terminal unit 202. In the path P3, the radio wave of the base station 201 is reflected by a building 203B and sent to the portable terminal unit 202.

The radio waves that are reflected by the buildings 202A and 203B and sent to the portable terminal unit 202 through the paths P2 and P3 are delayed from the radio wave that is directly sent from the base station 201 to the portable terminal unit 202 through the path P1. Thus, as shown in FIG. 2, signals S1, S2, and S3 reach the portable terminal unit 202 through the paths P1, P2, and P3 at different timings, respectively. When the signals S1, S2, and S3 through the paths P1, P2, and P3 interfere with each other, fading takes place. In the FDMA system and the TDMA system, the multi-paths cause the signal to be affected by the fading.

On the other hand, in the CDMA system, with the diversity RAKE method, the fading due to the multi-paths can be alleviated and the S/N ratio can be improved.

In a diversity RAKE system, as shown in FIG. 3, receivers 221A, 221B, and 221C that receive signals S1, S2, and S3 through the paths P1, P2, and P3 are disposed, respectively. A timing detector 222 detects codes received through the individual paths. The codes are set to the receivers 221A, 221B, 221C corresponding to the paths P1, P2, and P3, respectively. The receivers 221A, 221B, and 221C demodulate the signals received through the paths P1, P2, and P3. The received output signals of the receivers 221A, 221B, and 221C are combined by a combining circuit 223.

In the spectrum spread system, signals received through different paths are prevented from interfering with each other. The signals received through the paths P1, P2, and P3 are separately demodulated. When the demodulated output signals received through the respective paths are combined, the signal intensity becomes large and the S/N ratio improves. In addition, the influence of the fading due to the multi-paths can be alleviated.

In the above-described example, for simplicity, with the three receivers 221A, 221B, and 221C and the timing detector 222, the structure of the diversity RAKE system was shown. However, in reality, in a cellular telephone terminal unit of the diversity RAKE type, as shown in FIG. 4, fingers 251A, 251B, and 251C, a searcher 252, and a data combiner 253 are disposed. The fingers 251A, 251B, and 251C obtain demodulated output signals for the respective paths. The searcher 252 detects signals through multi-paths. The combiner 253 combines the demodulated data for the respective paths.

In FIG. 4, a received signal as a spectrum spread signal that has been converted into an intermediate frequency is supplied to an input terminal 250. This signal is supplied to a sub-synchronous detecting circuit 255. The sub-synchronous detecting circuit 255 is composed of a multiplying circuit. The sub-synchronous detecting circuit 255 multiplies a signal received from the input terminal 250 by an output signal of a PLL synthesizer 256. The output signal of the PLL synthesizer 256 is controlled by an output signal of a frequency combiner 257. The sub-synchronous detecting circuit 255 performs a quadrature detection for the received signal.

An output signal of the sub-synchronous detecting circuit 255 is supplied to an A/D converter 258. The A/D converter 258 converts the input signal into a digital signal. At this point, the sampling frequency of a controller 258 is much higher than the frequency of the PN code that is spectrum-spread. In other words, the input signal of the A/D converter 258 is over-sampled.

An output signal of the A/D converter 258 is supplied to the fingers 251A, 251B, and 251C. In addition, the output signal of the controller 258 is supplied to the searcher 252. The fingers 251A, 251B, and 251C de-spread the signals received through the respective paths, synchronize the signals, acquire the synchronization of the received signals, demodulate the data of these signals, and detect frequency errors of the signals.

The searcher 252 acquires the PN codes of the received signals and designates the phase of the PN codes of the paths to the fingers 251A, 251B, and 251C through the controller 254. In other words, the searcher 252 has a de-spreading circuit that multiplies a received signal by a PN code and de-spreads the signal. In addition, the searcher 252 shifts the phase of the PN code and obtains the correlation with the received code under the control of the controller 254. With the correlation between a designated code and a received code, a code for each path is determined.

An output signal of the searcher 252 is supplied to the controller 258. The controller 258 designates the phases of the PN codes for the fingers 251A, 251B, and 251C corresponding to the output signal of the searcher 252. The fingers 251A, 251B, and 251C de-spread the received signals and demodulate the received signals received through the respective phases using the designated phases of the PN codes.

The demodulated data is supplied from the fingers 251A, 251B, and 251C to the data combiner 253. The data combiner 253 combines the received signals received through the respective paths. The combined signal is obtained from an output terminal 259.

The fingers 251A, 251B, and 251C detect frequency errors. The frequency errors are supplied to the frequency combiner 257. With the output signal of the frequency combiner 257, the oscillation frequency of the PLL synthesizer 256 is controlled.

In a CDMA type cellular telephone system, one base station is disposed for every plurality of areas referred to as cells. The phase of a code received from the base station varies cell by cell. For example, in the case that a portable terminal unit is used in a mobile substance such as a car, when the mobile substance leaves a cell, a radio wave of the base station does not reach the mobile substance. Thus, demodulated data cannot be obtained. Even in a cell, if there is an obstacle such as a building, the radio wave of the base station does not reach the mobile substance. Thus, demodulated data may not be obtained. Conventionally, when demodulated data cannot be obtained, the searcher 252 shifts the PN code from the initial phase to the last phase, searches the PN code for all the phases, and acquires the received code. Thereafter, the acquired code is designated to the respective fingers 251A, 251B, and 251C. Thus, when demodulated data cannot be obtained, it takes a long search time.

OBJECTS AND SUMMARY OF THE INVENTION

Therefore, an object of the present invention is to provide a terminal unit for use with a radio system that allows the search time to be short in the case that demodulated data cannot be obtained and a searching method thereof.

The present invention is a terminal unit for use with a radio system for spectrum-spreading a transmission signal with a spread code, transmitting the resultant signal, varying the pattern and phase of a code sequence of the spread code, and performing a multiple-access, comprising a searcher for searching paths of signals received from multi-paths, a plurality of fingers for de-spreading the received signals for the searched paths and demodulating data, a combiner for combining output data of the fingers, memory means for storing a next alternative code and/or frequency and controlling means for controlling said searcher so as to perform corresponding to the next alternative code and/or frequency in case that demodulating data is not obtained and the memory means store the next alternative code and/or frequency.

The present invention is a searching method for use with a radio system for spectrum-spreading a transmission signal with a spread code, transmitting the resultant signal, varying the pattern and phase of a code sequence of the spread code, and performing a multiple-access, comprising the steps of storing a next alternative code and/or frequency beforehand, and when the demodulated data is not obtained, using the next alternative code and/or frequency.

A next alternative storing memory for storing a next alternative is disposed. When demodulated data cannot be obtained, a searching process is performed corresponding to the next alternative code stored in the next alternative storing memory. Thus, the search time can be shortened when demodulated data cannot be obtained.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

With reference to the accompanying drawings, an embodiment of the present invention will be described. FIG.

5 is a block diagram showing an example of a portable terminal unit for use with a cellular telephone system of CDMA type according to the present invention. The portable terminal unit uses the diversity RAKE system as the receiving system. In the diversity RAKE system, signals are received from a plurality of paths at the same time. The received signals are combined.

Figure 5:
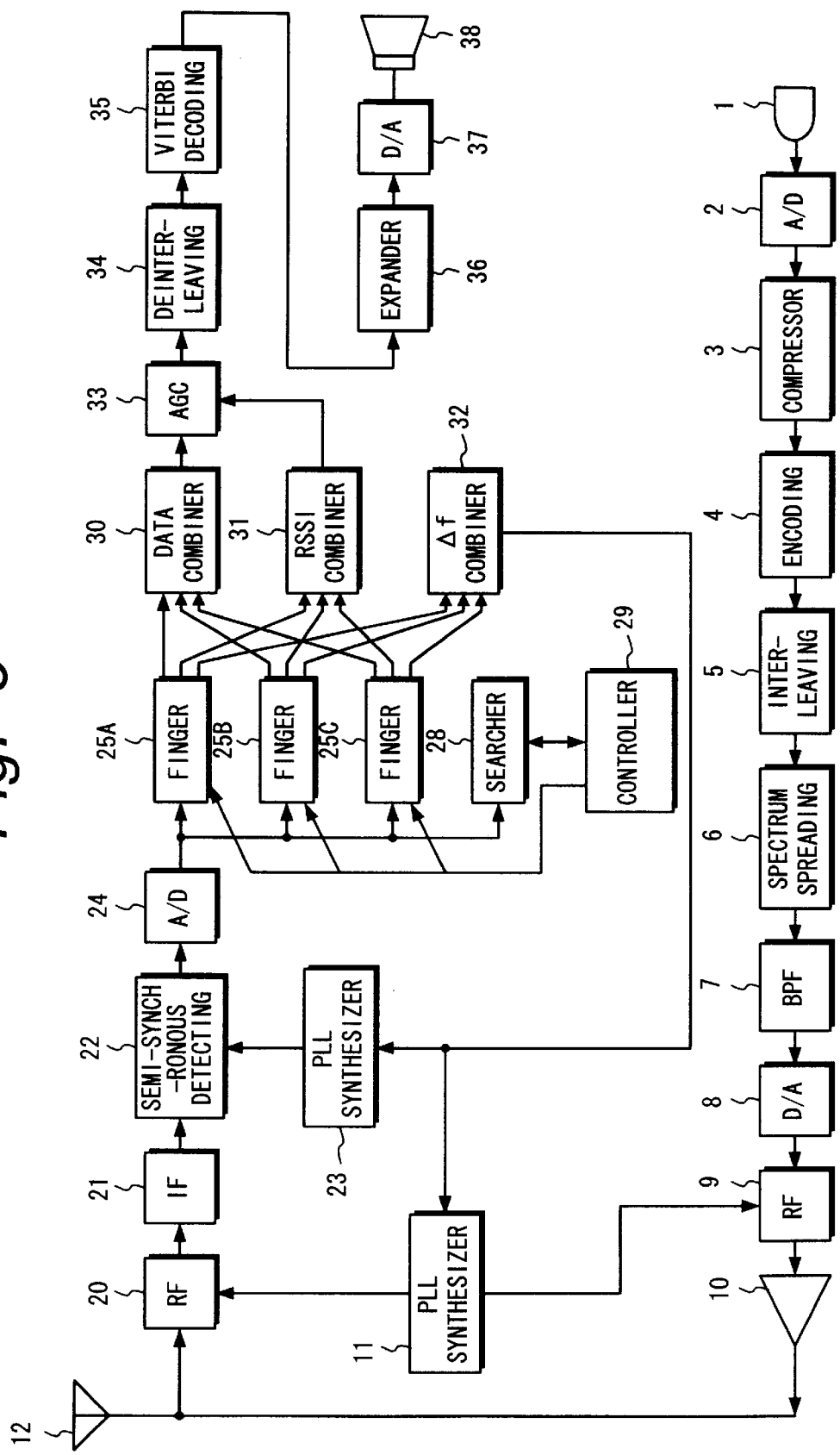
FIG. 5 is a block diagram showing the overall structure of a portable telephone terminal unit of CDMA type according to the present invention.

In FIG. 5, in the transmission mode, an audio signal is input to a microphone 1. The audio signal is supplied to an A/D converter 2. The A/D converter 2 converts an analog audio signal into a digital audio signal. An output signal of the A/D converter 2 is supplied to a audio compressing circuit 3.

The audio compressing circuit 3 compresses and encodes the digital audio signal. As examples of the compressing and encoding system, various types have been proposed. For example, a system such as QCELP (Qualcomm Code Excited Linear Predictive Coding) system can be used. In the QCELP system, depending on the characteristics of the sound of the user and the congestion state of the communication path, a plurality of encoding speeds can be used. In this case, four encoding speeds (9.6 kbps, 4.8 kbps, 2.4 kbps, and 1.2 kbps) can be selected. To maintain the communication quality, data can be encoded at the minimum speed. It should be noted that the audio compressing system is not limited to the QCELP system.

An output signal of the audio compressing circuit 3 is supplied to a convolutional encoding circuit 4. The convolutional encoding circuit 4 adds an error correction code as a convolutional code to the transmission data. An output signal of the convolutional encoding circuit 4 is supplied to an interleaving circuit 5. The interleaving circuit 5 interleaves the transmission data. An output signal of the interleaving circuit 5 is supplied to a spectrum spreading circuit 6.

The spectrum spreading circuit 6 primarily modulates the carrier and secondarily modulates the resultant signal with a PN code. In other words, the spectrum spreading circuit 6 primarily modulates the transmission data corresponding to, for example, balanced QPSK modulating method. In addition, the resultant signal is multiplied by a PN code. Since the PN code is a random code, when the PN code is multiplied, the frequency band of the carrier is widened. Thus, the carrier is spectrum-spread. As an example of the modulating method for the transmission data, the balanced QPSK modulating method is used. However, another modulating method can be used in various methods that have been proposed.

An output signal of the spectrum spreading circuit 6 is supplied to a D/A converter 8 through a band pass filter 7. An output signal of the D/A converter 8 is supplied to an RF circuit 9.

A local oscillation signal is supplied from a PLL synthesizer 11 to the RF circuit 9. The RF circuit 9 multiplies the output signal of the D/A converter 8 by the local oscillation signal of the PLL synthesizer 11 and thereby converts the frequency of the transmission signal into a predetermined frequency. An output signal of the RF circuit 9 is supplied to a transmission amplifier 10. After the power of the transmission signal is amplified, the resultant signal is supplied to an antenna 12. A radio wave is sent from the antenna 12 to a base station.

In the reception mode, a radio wave sent from a base station is received by the antenna 12. Since the radio wave sent from the base station is reflected by buildings and so forth, the radio wave reaches the antenna 12 of the portable terminal unit through multi-paths. When the portable terminal unit is used in a car or the like, the frequency of the received signal may vary due to the Doppler effect.

The output signal of the antenna 12 is supplied to an RF circuit 20. The RF circuit 20 receives a local oscillation signal from the PLL synthesizer 11. The RF circuit 20 converts the received signal into an intermediate frequency signal with a predetermined frequency.

An output signal of the RF circuit 20 is supplied to a semi-synchronous detecting circuit 22 through an intermediate frequency circuit 21. An output signal of a PLL synthesizer 23 is supplied to the semi-synchronous detecting circuit 22. The frequency of the output signal of the PLL synthesizer 23 is controlled with an output signal of a frequency combiner 32. The semi-synchronous detecting circuit 22 quadrature-detects the received signal.

An output signal of the semi-synchronous detecting circuit 22 is supplied to an A/D converter 24. The A/D converter 24 digitizes the output signal of the semi-synchronous detecting circuit 22. At this point, the sampling frequency of the A/D converter 24 is higher than the chip-rate of the PN code that has been spectrum-spread. In other words, the input signal of the A/D converter is oversampled. An output signal of the A/D converter 24 is supplied to fingers 25A, 25B, and 25C. In addition, the output signal of the A/D converter 24 is supplied to a searcher 28.

As described above, in the reception mode, signals are received through multi-paths. The fingers 25A, 25B, and 25C multiply the signals received through the multi-paths by the PN code so as to de-spread the received signals. In addition, the fingers 25A, 25B, and 25C output the levels of the signals received through the multi-paths and the frequency errors of these multi-paths.

The searcher 28 acquires the codes of the received signals and designates the phase of the PN codes for the paths. In other words, the searcher 28 has a de-spreading circuit that multiplies the received signals by the respective PN codes and de-spreads the received signals. The searcher 28 shifts the phases of the PN codes under the control of a controller 29 and obtains the correlation with the PN received codes. With the correlation values of the designated codes and the received codes, the codes for the respective paths are designated. The phase of the codes designated by the controller 29 are supplied to the fingers 25A, 25B, and 25C.

The received data for the respective paths demodulated by the fingers 25A, 25B, and 25C is supplied to a data combiner 30. The data combiner 30 combines the received data for the respective paths. An output signal of the data combiner 30 is supplied to an AGC circuit 33.

The fingers 25A, 25B, and 25C obtain the intensities of the signals received through the respective paths. The intensities of the signals received through the respective path are supplied from the fingers 25A, 25B, and 25C to an RSSI combiner 31. The RSSI combiner 31 combines the intensities of the signals received through the respective paths. An output signal of the RSSI combiner 31 is supplied to the AGC circuit 33. The gain of the AGC circuit 33 is controlled so that the signal level of the received data becomes constant.

The frequency errors for the respective paths are supplied from the fingers 25A, 25B, and 25C to the frequency combiner 32. The frequency combiner 32 combines the frequency errors for the respective paths. An output signal of the frequency combiner 32 is supplied to the PLL synthesizer 11 and 23. Corresponding to the resultant frequency error, the frequencies of the PLL synthesizer 11 and 23 are controlled.

An output signal of an AGC circuit 33 is supplied to a de-interleaving circuit 34. The de-interleaving circuit 34 de-interleaves the received data that has been interleaved on the transmission side. An output signal of the de-interleaving circuit 34 is supplied to a Viterbi decoding circuit 35. The Viterbi decoding circuit 35 decodes a convolutional code with a soft determining process and a maximum likelihood decoding process. The Viterbi decoding circuit 35 performs an error correcting process. An output signal of the Viterbi decoding circuit 35 is supplied to an audio expanding circuit 36.

The audio expanding circuit 36 decompresses the audio signal that has been compressed with for example the QCELP method and decodes a digital audio signal. The digital audio signal is supplied to a D/A converter 37. The D/A converter 37 restores a digital audio signal to an analog audio signal. The analog audio signal is supplied to a speaker 38.

Figure 1:
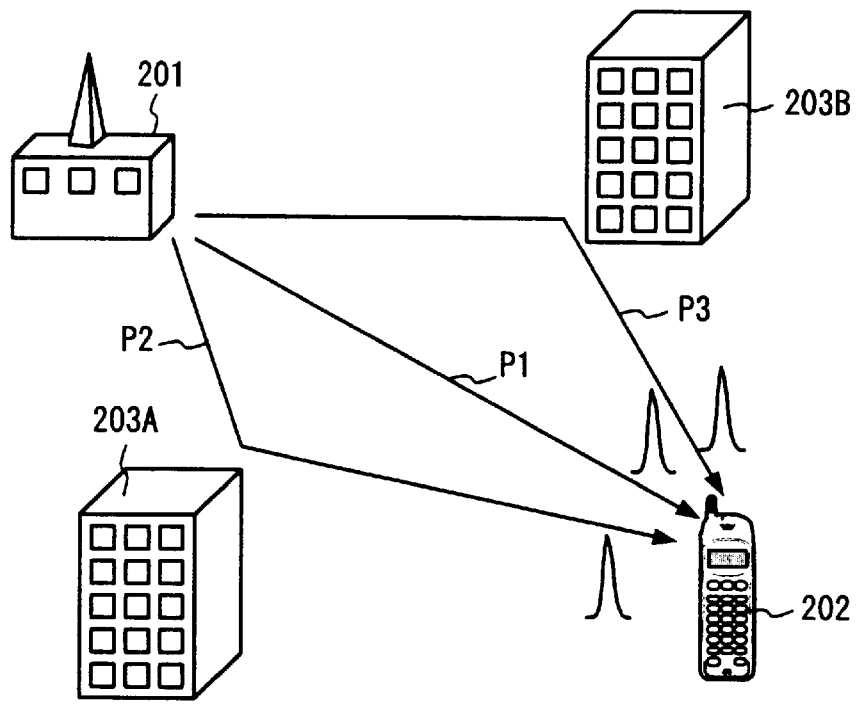
FIG. 1 is a schematic diagram for explaining multi-path interference.
Figure 2:
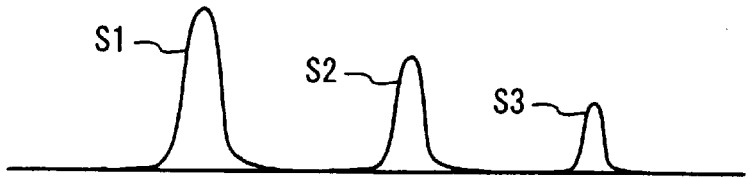
FIG. 2 is a schematic diagram showing a waveform for explaining multi-path interference.
Figure 3:
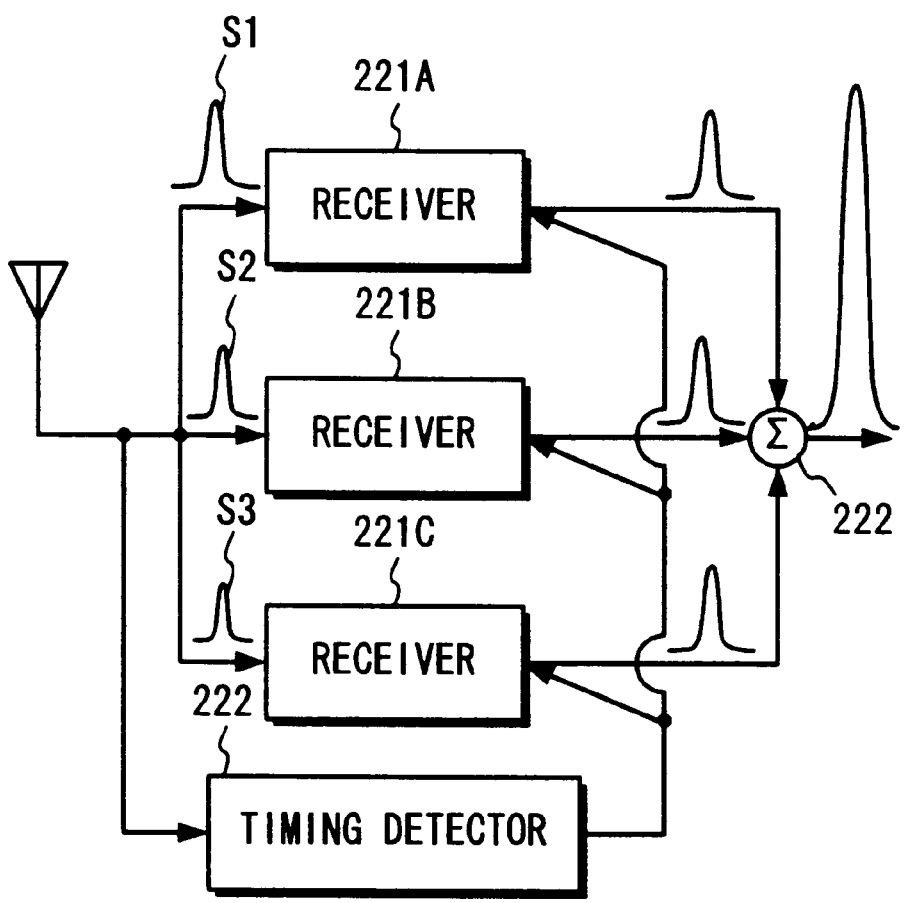
FIG. 3 is a block diagram for explaining a diversity RAKE system.
Figure 4:
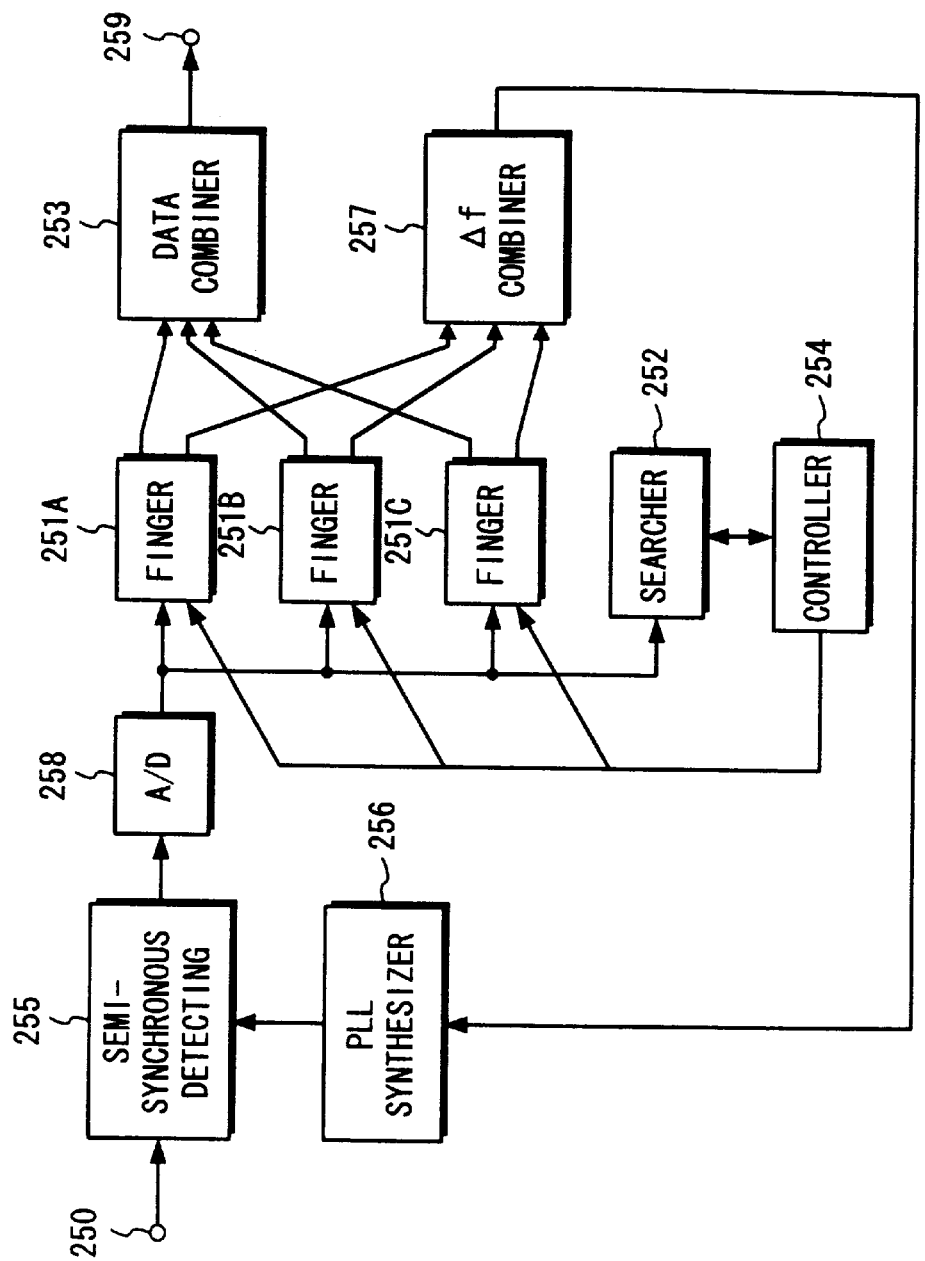
FIG. 4 is a block diagram showing an example of a receiver of the diversity RAKE system.
Figure 6:
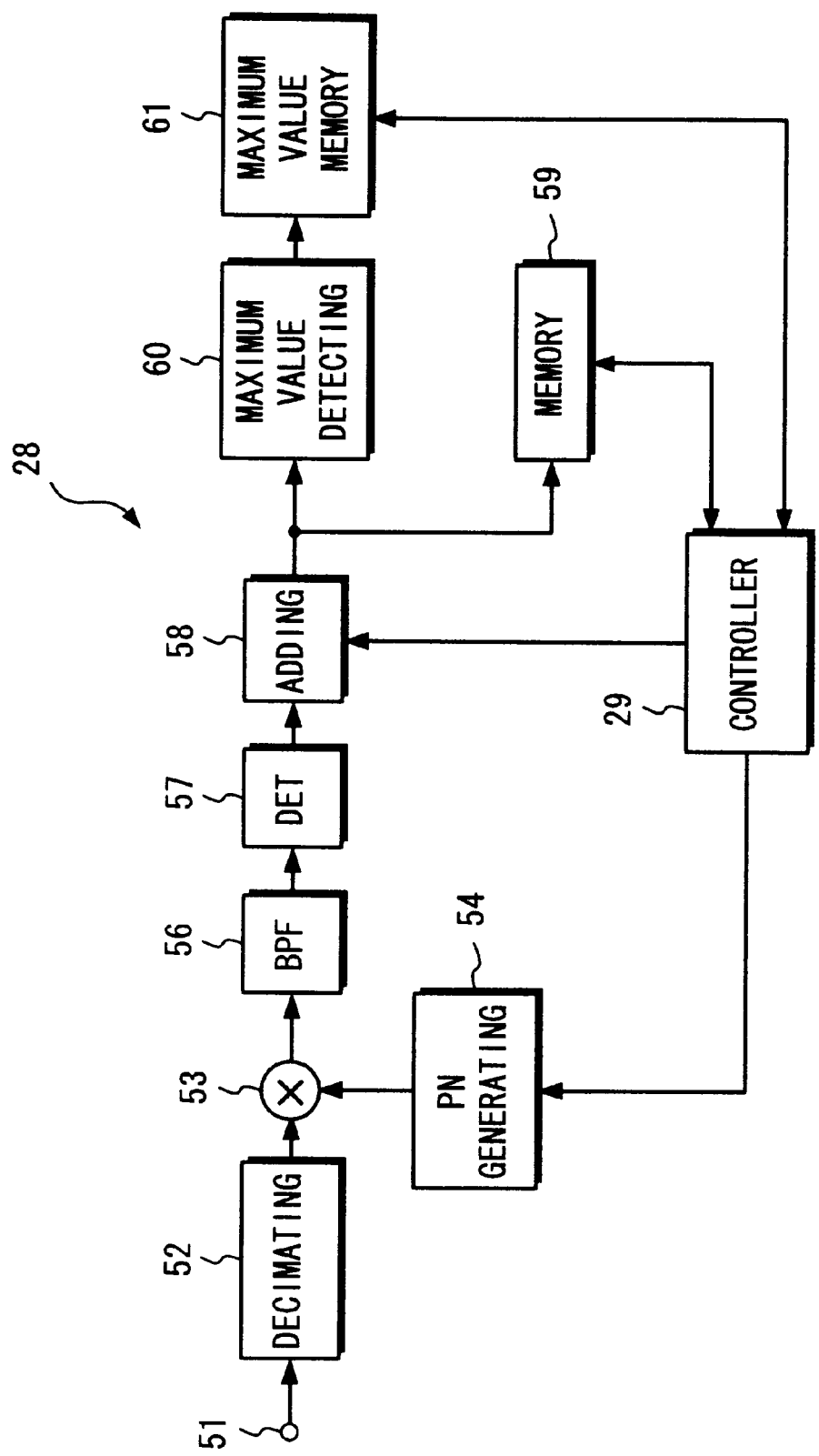
FIG. 6 is a block diagram showing an example of the structure of a searcher of the portable telephone terminal unit of CDMA type according to the present invention.

FIG. 6 is a block diagram showing the structure of the searcher 28 of the portable telephone terminal unit according to the present invention. In FIG. 6, a digital signal is supplied from the A/D converter 24 (see FIG. 1) to an input terminal 51. As described above, the sampling frequency of the A/D converter 24 is higher than the chip-rate of the PN code. In other words, the digital signal is over-sampled. The digital signal is supplied from the input terminal 51 to a decimating circuit 52. The decimating circuit 52 decimates the signal received from the input terminal 51. An output signal of the decimating circuit 52 is supplied to a multiplying circuit 53.

A PN code generating circuit 54 generates a PN code that was used to spread on the transmission side. The phase of the PN code received from the PN code generating circuit 54 can be designated by a controller 29. The PN code received from the PN code generating circuit 54 is supplied to the multiplying circuit 53.

The multiplying circuit 53 multiplies the output signal of the decimating circuit 52 by the PN code received from the PN code generating circuit 54. Thus, the received signal from the input terminal 51 de-spreads. When the pattern and the phase of the received code match the pattern and the phase of the code received from the PN code generating circuit 54, the received signal de-spreads. Thus, the level of an output signal of the multiplying circuit 53 becomes large. The output signal of the multiplying circuit 53 is supplied to a level detecting circuit 57 through a band pass filter 56. The level detecting circuit 57 detects the level of the output signal of the multiplying circuit 53.

An output signal of the level detecting circuit 57 is supplied to an adding circuit 58. The adding circuit 58 accumulates output data a predetermined number of times (for example, 64 times). With the cumulated value of the output data of the level detecting circuit 57, correlation values of the PN code designated to the PN code generating circuit 54 and the received PN code are obtained. An output signal of the adding circuit 58 is supplied to a memory 59. In addition, the output signal of the adding circuit 58 is supplied to a maximum value detecting circuit 60. The maximum value detecting circuit 60 obtains the maximum value of the correlation values. The maximum value of the correlation value is stored in a maximum value memory 61.

The phase of the PN code received from the PN code generating circuit 54 is shifted every predetermined number of chips (for example, every chip or every ½ chip). The correlation values are obtained from the output signal of the adding circuit 58 for each phase. The correlation values are stored in the memory 59. After the PN code has been designated for one period, for example, three phases with the largest correlation values are selected. The selected phases are designated to the fingers 25A, 25B, and 25C through the controller (see FIG. 5). When the three phases are selected in the order of the larger correlation values and three paths are designated, the maximum value stored in the maximum value memory 61 is used.

Figure 7:
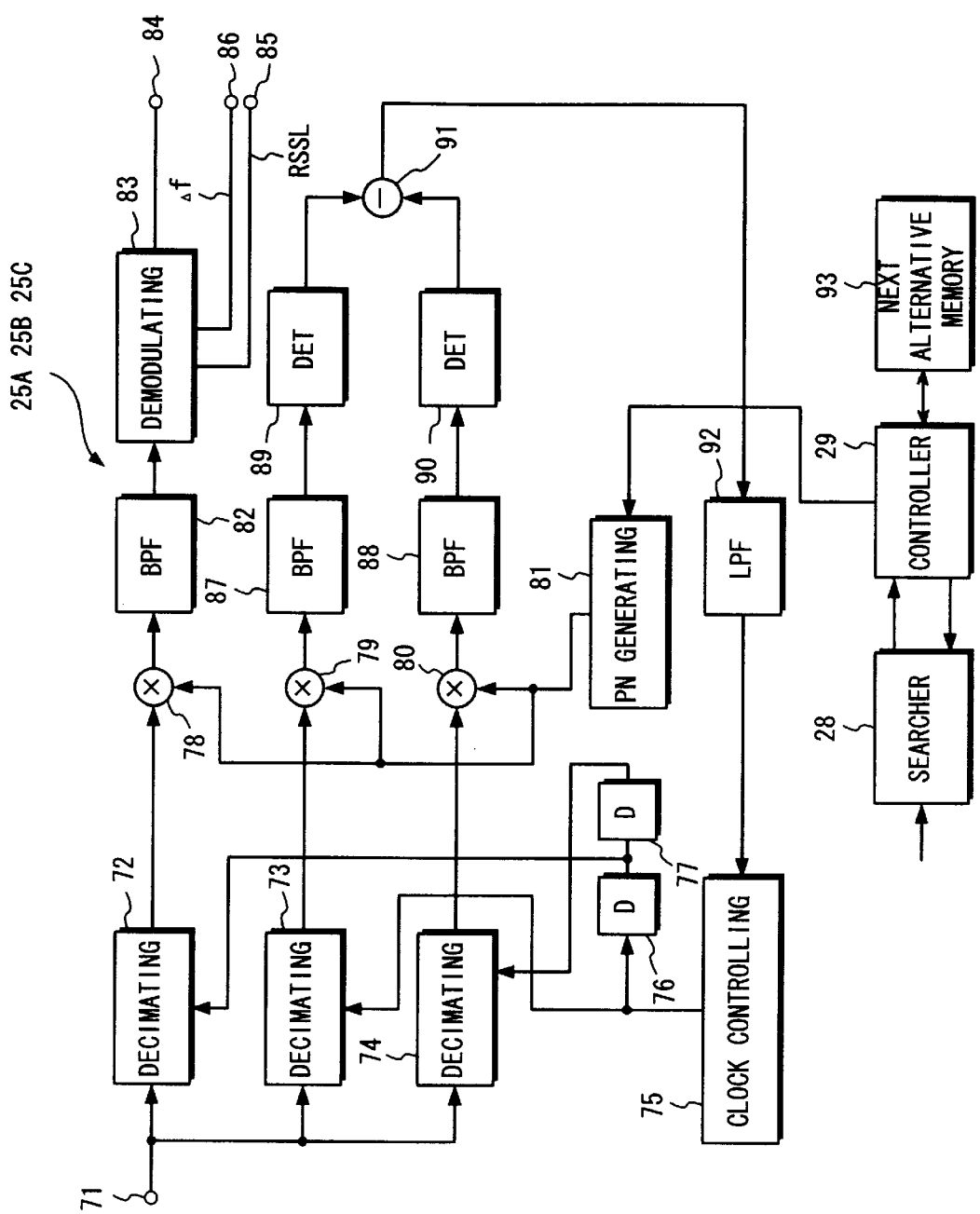
FIG. 7 is a block diagram showing an example of the structure of a finger of the portable telephone terminal unit of CDMA type according to the present invention.

FIG. 7 is a block diagram showing the structure of each of the fingers 25A, 25B, and 25C of the portable telephone terminal unit according to the present invention. In FIG. 7, a digital signal is supplied from the A/D converter 24 (see FIG. 5) to an input terminal 71. As described above, the sampling frequency of the A/D converter 24 is higher than the chip-rate of the PN code. In other words, the digital signal is over-sampled.

The digital signal is supplied from the input terminal 71 to decimating circuits 72, 73, and 74. A clock is supplied from a clock controlling circuit 75 to the decimating circuit 72 through a delaying circuit 76. The clock from the clock controlling circuit 75 is directly supplied to the decimating circuit 73. The clock from the clock controlling circuit 75 is supplied to the decimating circuit 74 through delaying circuits 76 and 77. Each of the delaying circuits 76 and 77 has a delay amount for ½ chip. The decimating circuits 72, 73, and 74 decimate the digital signal received from the input terminal 71.

Output signals of the decimating circuits 72, 73, and 74 are supplied to multiplying circuits 78, 79, and 80, respectively. The PN code is supplied from a PN code generating circuit 81 to the multiplying circuits 78, 79, and 80. The PN code generating circuit 81 generates the same PN code that has spread on the transmission side.

The multiplying circuit 78 multiplies the output signal of the decimating circuit 72 by an output signal of the PN code generating circuit 81. When the pattern and the phase of the received PN code match the pattern and the phase of the code received from the PN code generating circuit 81, the multiplying circuit 78 outputs a de-spread signal. An output signal of the multiplying circuit 78 is supplied to a demodulating circuit 83 through a band pass filter 82.

The demodulating circuit 83 demodulates the received signal. The demodulating circuit 83 outputs demodulated data. The demodulated data is output from an output terminal 84. The demodulating circuit 83 detects the level of the received signal. The signal level is obtained from an output terminal 85. The demodulating circuit 83 detects a frequency error. The frequency error is obtained from an output terminal 86.

The multiplying circuits 79 and 80 multiply output signals of the decimating circuits 73 and 74 by the output signal of the PN code generating circuit 81, respectively. The clock of the clock controlling circuit 75 is directly supplied to the decimating circuit 73. The clock supplied from the clock controlling circuit 75 to the decimating circuit 74 is delayed by one chip. Assuming that the phase of the output signal of the decimating circuit 72 is the center phase, an output signal with a phase advanced by ½ chip from the center phase and an output signal with a phase delayed by ½ chip from the center phase are obtained from the decimating circuits 73 and 74, respectively. The multiplying circuits 79 and 80 multiply the signal with the phase advanced by ½ chip from the center phase and the signal with the phase delayed by ½ chip from the center phase by the code received from the PN code generating circuit 81. Thus, de-spread output signals with the phases advanced by ½ chip and delayed by ½ chip from the center phase are obtained. Output signals of the multiplying circuits 79 and 80 are used to form a DLL (Delay Locked Loop).

In other words, the output signals of the multiplying circuits 79 and 80 are supplied to level detecting circuits 89 and 90 through band pass filters 87 and 88, respectively. The level detecting circuits 89 and 90 output the levels of the de-spread signals with the phases advanced by ½ chip and delayed by ½chip. Output signals of the level detecting circuits 89 and 90 are supplied to a subtracting circuit 91.

The subtracting circuit 91 compares the level of the de-spread signal with the phase advanced by ½chip and the level of the de-spread signal with the phase delayed by ½ chip. An output signal of the subtracting circuit 91 is supplied to the clock controlling circuit 75 through a loop filter 92. The clock controlling circuit 75 controls the clock supplied to the decimating circuits 72 to 74 so that the level of the output signal of the subtracting circuit 91 becomes 0.

Assuming that an input signal is over-sampled eight times by the A/D converter 24 and that the resultant signal is ⅛ decimated by the decimating circuits 72 to 74, the decimating circuits 72 to 74 output signals at intervals of every eight samples. When it is determined that the current timing is very late corresponding to the output signal of the subtracting circuit 91, the signal is output at intervals of every seven samples instead of every eight samples. Thus, the phase of the signal is advanced.

Initial phase data is supplied from a controller 29 to the PN code generating circuit 81. The initial phase data is designated corresponding to a path detected by the searcher 28. Corresponding to the fluctuation of the PN code, the above-described DLL loop operates so as to acquire the received code.

In this example, a next alternative storing memory 93 that stores a next alternative PN code is disposed. When demodulated data cannot be obtained, the next alternative code is stored in the next alternative storing memory 93. Examples of the next alternative code are:

(1) PN code and frequency received corresponding to an adjacent base station.

(2) PN code shifted from the phase of the current PN code by the phase corresponding to the offset of a code with an adjacent base station or frequency shifted from the current frequency by the frequency corresponding to the offset of a frequency with an adjacent base station.

(3) PN code and frequency corresponding to a base station that has been connected.

In other words, for example, a portable terminal unit is disposed in a mobile unit such as a car. When the mobile unit moves to an adjacent cell, a code corresponding to a base station of the adjacent cell is designated as the next PN code.

Thus, when a PN code of an adjacent base station has been received, the PN code is stored as the next alternative PN code in the next alternative storing memory 93.

When a code of an adjacent base station has not been received, since the phase of the PN code of the adjacent base station is shifted by the phase corresponding to a predetermined offset, a code shifted from the phase of the current PN code by the phase corresponding to the offset of the PN code with the adjacent base station is stored as the next alternative code in the next alternative storing memory 93.

When demodulated data cannot be temporarily obtained due to an obstruction such as a building or when the mobile substance is in the boundary of a cell, a PN code of a base station that has been connected is designated as the next PN code. Thus, the PN codes of base stations that have been connected are stored as next alternative PN codes in the next alternative storing memory 93.

This applies to a frequency to be designated as well as the phase of a PN code. Alternatively, these codes may be designated priority levels. Corresponding to the priority levels, next alternative codes may be selected and used.

In this example, the next alternative storing memory 93 stores a next alternative PN code. With the code information of the next alternative stored in the next alternative storing memory 93, the searching process can be performed at high speed when demodulated data cannot be obtained.

Figure 8:
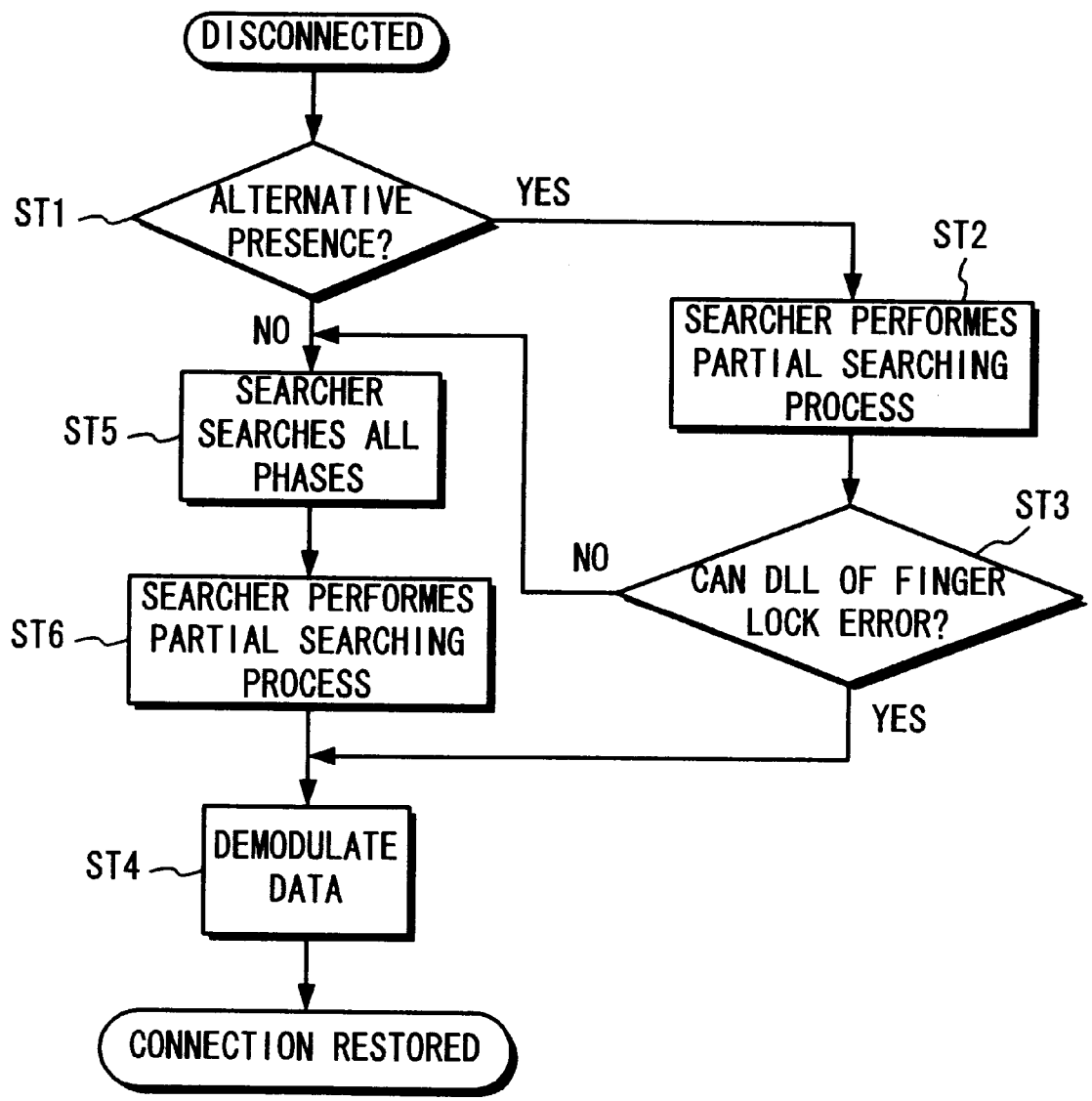
FIG. 8 is a flow chart showing an example of a process in the case that demodulated data of the portable telephone terminal unit of CDMA type according to the present invention cannot be obtained.

FIG. 8 shows the searching process. When demodulated data cannot be obtained from the fingers 25A, 25B, and 25C, it is determined whether or not PN code information as the next alternative has been stored in the next alternative storing memory 93 (at step ST1). When the PN code information of the next alternative has been stored in the next alternative storing memory 93, the searching process is performed with the code information (at step ST2). A code with a phase obtained in the searching process is designated to the fingers 25A, 25B, and 25C. When an error between the designated PN code and the received PN code is in the range locked by the DLL, the received signal de-spreads. Thus, demodulated data is obtained from the fingers 25A, 25B, and 25C. Next, it is determined whether or not demodulated data is obtained from the fingers 25A, 25B, and 25C (at step ST3). When demodulated data is obtained, the demodulating process is continued with the current code (at step ST4).

When demodulated data is not obtained at step ST3 or when the determined result at step ST1 is No (namely, the next alternative code has not been stored), the searcher 28 searches all phases from the initial phase (at step ST5). After the searching process is completed, a code is designated to the fingers 25A, 25B, and 25C corresponding to the code acquired by the searcher 28. With the code, a partial searching process is performed (at step ST6). When the error between the designated code and the received code is in the range locked by the DLL, the received signal de-spreads. Thus, demodulated data is obtained from the fingers 25A, 25B, and 25C. When the demodulated data is obtained, the demodulating process is continued with the code (at step ST4).

According to the present invention, a next alternative storing memory that stores a next alternative PN code is provided. When demodulated code cannot be obtained, the searching process is performed corresponding to the next alternative code stored in the next alternative storing memory. Thus, when the demodulated data cannot be obtained, the search time can be shortened.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. A terminal unit for use with a base station that spectrum spreads a transmission signal with a spread code, transmits a resultant signal to the terminal unit, varies the pattern and phase of a code sequence of the spread code, and performs multiple-access, the terminal unit comprising:

a searcher for searching signals received via multiple signal paths;

a plurality of finger units for de-spreading the received signals from the searched paths and for demodulating data contained in the signals;

a combiner for combining output data of said plurality of finger units into an output signal;

memory means for storing one of a next alternative code to the spread code and a next alternative frequency; and controlling means for controlling said searcher so as to perform searching corresponding to one of the next alternative code and the next alternative frequency stored in said memory means in case the demodulated data is not obtained by said plurality of finger units.

2. The terminal unit as set forth in claim 1, wherein the next alternative code and next alternative frequency are a spread code and a frequency corresponding to a base station adjacent the base station that transmits the resultant signal to the terminal unit.

3. The terminal unit as set forth in claim 1, wherein the next alternative code and next alternative frequency are a code and frequency corresponding to a base station previously connected by transmission to the terminal unit.

4. The terminal unit as set forth in claim 1, wherein the next alterative code and next alternative frequency are a code and frequency that are shifted by a phase corresponding to an offset of a code and frequency of a base station adjacent the base station that transmits the resultant signal to the terminal unit.

5. A searching method for use with a base station that spectrum spreads a transmission signal with a spread code, transmits a resultant signal, varies a pattern and phase of a code sequence of the spread code, and performs multiple-access, the method comprising the steps of:

storing one of a next alternative code and next alternative frequency;

searching for signals from the base station received via multiple signal paths; and de-spreading the received signals from the searched paths and demodulating data of the received signals, wherein when demodulated data is not obtained, the step of searching is performed corresponding to one of the next alternative code and next alternative frequency that was stored in said step of storing.

6. The searching method as set forth in claim 5, wherein the next alternative code and next alternative frequency are a code and a frequency corresponding to a base station adjacent the base station transmitting the transmission signal.

7. The searching method as set forth in claim 5, wherein the next alternative code and next alternative frequency are a code and a frequency corresponding to a base station previously connected by transmission to a terminal unit.

8. The searching method as set forth in claim 5, wherein the next alternative code and next alternative frequency are one of a code and a frequency that is shifted in a phase and frequency corresponding to an offset of a code and frequency of a base station adjacent the base station transmitting the transmission signal.

* * * * *